May 12, 1931. I. A. SHANTON 1,804,439
LAWN MOWER SHARPENER ATTACHMENT
Filed Aug. 8, 1928
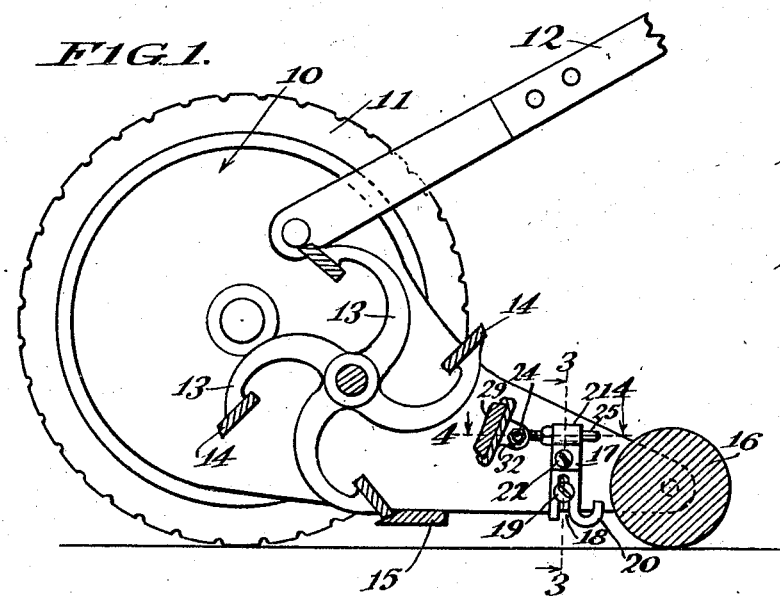
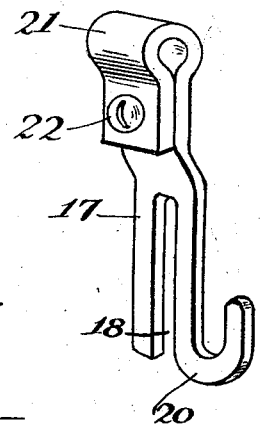
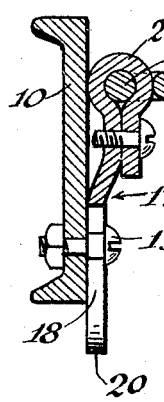
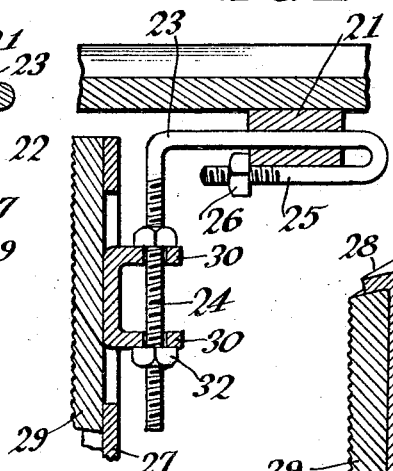
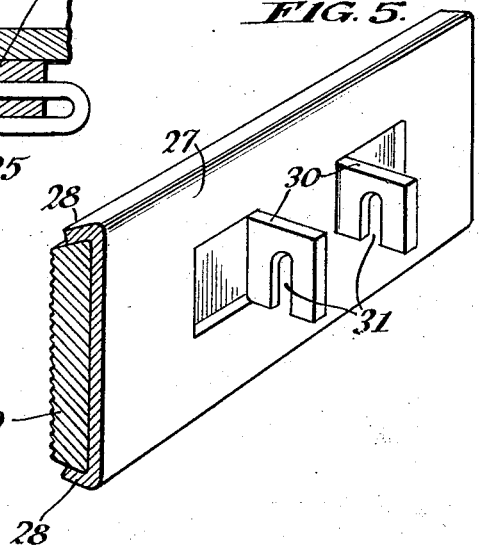
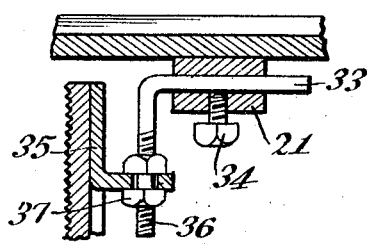
INVENTOR.
IRA A. SHANTON.
By Martin P. Smith
ATT'Y.

Patented May 12, 1931

1,804,439

UNITED STATES PATENT OFFICE

IRA A. SHANTON, OF ST. PETERSBURG, FLORIDA

LAWN MOWER SHARPENER ATTACHMENT

Application filed August 8, 1928. Serial No. 298,289.

My invention relates to a lawn mower sharpener attachment and has for its principal objects the provision of a relatively simple, practical and inexpensive attachment that is capable of being easily and quickly applied to or removed from the frames of lawn mowers, and to construct the attachment so that it will very firmly support a sharpening element in position to be engaged by the cutting edges of the blades of the lawn mower, thus enabling said blades to be sharpened during operation of the mower.

A further object of my invention is to provide a lawn mower sharpener attachment that has a wide range of adjustability in order that it may be utilized to advantage on lawn mowers of different makes and sizes.

A further object of my invention is to improve upon and simplify the construction of the lawn mower sharpener attachment set forth in my copending application for United States Letters Patent filed August 29, 1927, Serial Number 216,280.

With the foregoing and other objects in view, my invention consists in certain novel features of construction and arrangement of parts that will hereinafter be more fully described and claimed and illustrated in the accompanying drawings, in which:—

Fig. 1 is a vertical section taken through the center of a lawn mower and showing my improved sharpener attachment in position for use thereupon.

Fig. 2 is a perspective view of one of the combined supporting clamps and brackets utilized in my improved sharpener attachment.

Fig. 3 is an enlarged vertical section taken on the line 3—3 of Fig. 1.

Fig. 4 is an enlarged horizontal section taken on the line 4—4 of Fig. 1.

Fig. 5 is a perspective view of the end portion of the plate that receives and supports the file or sharpening element that acts upon the edges of the cutter blades.

Fig. 6 is a horizontal section similar to Fig. 4 and showing a modified form of the adjustable attachment.

Referring by numerals to the accompanying drawings which illustrate a practical embodiment of my invention, 10 designates one of the side frames of the mower, 11 one of the lawn mower traction wheels, 12 the handle of the mower, 13 the reel which carries the usual cutter blades 14, which latter engage against a fixed cutter bar 15 that is disposed between the lower portions of the frames 10, and 16 the usual ground roller that is arranged for operation between the rear ends of the side frame 10.

My attachment includes a pair of clamping brackets of the type illustrated in Fig. 2, and these brackets are adjustably secured on the inner faces of the side frames 10 just in front of the ground roller 16.

Each bracket comprises a vertically disposed plate 17 in the lower portion of which is formed a slot 18 for the reception of one or more screws or bolts 19, which latter are seated in the side frame 10, and when these bolts are tightened the plates are very firmly secured to the side frames. A portion of the lower end of each plate to the rear of the slot 18 therein is provided with an integral upturned hook 20 that functions as a support or point of attachment for a part of the frame that carries the grass receptacle, and which latter is usually formed of canvas or like fabric.

The upper portion of each attaching plate is bent double to form a horizontally disposed tubular bearing 21 and that portion of the doubled-over upper end of the plate overlies the outer face of the plate and receives a screw or bolt 22, which latter passes through the body of the plate 17 just below the tubular bearing 21.

Arranged in the tubular bearing 21 is the horizontally disposed portion 23 of a rod and extending laterally at right angles from the forward end of this rod is a shank portion 24 on which is formed a screw thread.

The relative sizes of the rod 23 and the opening through the tubular bearing 21 are such that when the screw or bolt 22 is loosened or withdrawn the rod 23 may be moved freely through the bearing, but by tightening the screw or bolt 22 the bearing 21 is contracted so as to very firmly clamp the rod 23 and retain the same in its adjusted position.

The rear end portion of rod 23 is rebent forwardly to form a shank portion 25 that lies parallel with the body portion of said rod 23 and the end of this shank portion is threaded for the reception of a nut 26. When the rod 23 is clamped in the bearing 21 the shank 25 occupies a position parallel with and immediately adjacent to the bearing 21, as illustrated in Fig. 4, and by adjusting the position of nut 26 on the threaded portion of said shank 25 the clamping engagement between the bearing and rod is materially increased and said rod is effectually prevented from moving rearwardly through the bearing as a result of thrusts or pressure resulting from the engagement of the cutter blades with the sharpening element that is supported by the shank portions 28 of the rods 23.

The holder for the sharpening element utilized in my improved sharpening attachment comprises a plate 27 preferably formed of suitable sheet metal having its upper and lower edges bent to form retaining flanges 28, and positioned between said flanges is a sharpening element 29, either a plate of hardened metal such as steel that has its outer face provided with file teeth, or such sharpening element may be in the form of a plate of emery or carborundum.

Formed integral with or fixed to the holder 27 near each end is a pair of outwardly projecting parallel ears 30, and formed therein are short vertically disposed slots 31, the lower ends of which are open.

When the sharpening element is mounted on the threaded shanks 24 of the supporting members 25 the slots 31 receive the threaded shanks 24, as illustrated in Fig. 4, and by tightening the nut 32 against the outer faces of the ears 30 the sharpening element support is very firmly secured to the shanks 24 in adjusted position.

By loosening the nuts 32 the sharpening element may be swung vertically into the proper angle to engage the cutting edges of the blades 14 as said cutting edges sweep across the face of the sharpening element, and thus the desired bevel is formed on said cutting edges and at the same time said edges are effectually sharpened.

By proper manipulation of the screws or bolts 19 the plates 17 may be adjusted vertically and firmly clamped to the side frames after adjustment and the rod 23 may be adjusted horizontally in its bearing 21 and firmly clamped in adjusted position by tightening the screw or bolt 22.

The sharpening element may be adjusted so as to occupy the proper angular position relative to the cutting edges of the blades 14, and locked in such adjusted position by tightening the nuts 32, and the pressure or thrust of the blades against the sharpening element is effectually resisted by the nuts 26 that bear against the front edges of the tubular bearings 21 at the upper ends of the clamping plates.

Thus it will be seen that my improved sharpener attachment is universally adjustable and that it may be very easily and quickly applied to or removed from the frame of the lawn mower. It will be understood that the holder 27 for the sharpening element 29 extends transversely of the lawn-mower between the side frames 10 and that said holder is firmly supported at each end by the angle members comprising the parts 23, 24 and 25 and which angle members are firmly secured to the adjustable brackets comprising the parts 17 and 21 and which adjustable members are clamped to the side frames of the lawn mower by the screws 19.

In Fig. 6 I have shown a modified construction wherein the clamping bearing 21 at the upper end of the plate 17 receives the straight shank 33 of a rod and screw seated in the outer portion of the bearing 21 is a set screw 34 that bears against said shank 33 to lock the same in its adjusted position within the bearing 21.

In this modified construction the sharpening element carrying plate 35 is provided near its end with a single rearwardly projecting ear which receives the threaded shank portion 36 that projects at right angles from the forward end of shank 33 and arranged on this threaded shank 36 on opposite sides of the ear are nuts 37 which when tightened will very securely lock the sharpening element support to the shank 36.

Thus it will be seen that I have provided a lawn mower sharpener attachment that is relatively simple in construction, inexpensive of manufacture, universal in adjustment, capable of being easily and quickly applied to or removed from the frames of practically all makes and sizes of lawn mowers, and which attachment is very effective in performing the functions for which it is intended.

It will be understood that minor changes in the size, form and construction of the various parts of my improved lawn mower sharpener attachment may be made and substituted for those herein shown and described without departing from the spirit of my invention, the scope of which is set forth in the appended claims.

I claim as my invention:

1. The combination with a lawn mower of clamping plates adjustably mounted on the inner faces of the side frames of the lawn mower, angle brackets having their outer legs composed of parallel members, the outer members of each pair of parallel members being seated in said clamping plates, means adjustably mounted on the inner members of each pair of parallel members for engaging the clamping plates for limiting the rearward movement of said angle brackets the inwardly projecting legs of said angle brackets being threaded, a channel shaped sharpening element carrier positioned directly in front of the threaded inwardly projecting legs of said angle brackets, slotted ears projecting rearwardly from said channel-shaped carrier, which slotted ears receive the threaded ends of the angle brackets, nuts mounted on the threaded legs of said angle brackets on opposite sides of said ears and a sharpening element arranged within said channel-shaped carrier.

2. The combination with a lawn mower of clamping plates adjustably mounted on the inner faces of the side frames of the lawn mower, angle brackets having their outer legs composed of parallel members, the outer members of each pair of parallel members being seated in said clamping plates, means adjustably mounted on the inner members of each pair of parallel members for engaging the clamping plates for limiting the rearward movement of said angle brackets, the inwardly projecting legs of which angle brackets are threaded, a channel shaped sharpening element carrier arranged directly in front of the threaded legs of said angle brackets, pairs of ears projecting rearwardly from said channel-shaped sharpening element carrier adjacent to its ends, which ears are provided with vertical slots for the accommodation of the threaded legs of the angle brackets, nuts located on the threaded legs of said angle brackets and bearing against said ears for clamping the carrier to the angle brackets in adjusted position and a sharpening element arranged within said channel-shaped carrier.

3. In a sharpener attachment for lawn mowers, a channel-shaped carrier, a sharpening element positioned in said carrier, pairs of slotted ears projected rearwardly from said carrier adjacent to its ends, angle brackets having threaded portions that project through the slots in said ears, brackets adjustably mounted on the sides of the lower frame and means on the upper ends of said brackets for receiving and clamping the legs of the angle brackets that project from the threaded portions thereof.

4. In a sharpener attachment for lawn mowers, a channel-shaped carrier, a sharpening element positioned in said carrier, pairs of slotted ears projected rearwardly from said carrier adjacent to its ends, angle brackets having threaded portions that project through the slots in said ears, nuts mounted on the threaded portions of said angle brackets and bearing against said slotted ears for adjustably clamping the carrier to said angle brackets, brackets adjustably secured on the outer portions of the angle brackets for adjustably securing same to the sides of a lawn mower frame and means adjustably mounted on the outer portions of said angle brackets for limiting the rearward movement of said brackets and the sharpening element carrier.

In testimony whereof I affix my signature.

IRA A. SHANTON.